United States Patent [19]

Kauppi

[11] Patent Number: 4,677,523
[45] Date of Patent: Jun. 30, 1987

[54] APPARATUS FOR HOLDING A PLURALITY OF CAPACITORS

[75] Inventor: Göran Kauppi, Taby, Sweden

[73] Assignee: Siemens Aktiengesellschaft, Berlin and Munich, Fed. Rep. of Germany

[21] Appl. No.: 858,022

[22] Filed: May 1, 1986

[30] Foreign Application Priority Data

May 21, 1985 [DE] Fed. Rep. of Germany ....... 3518236

[51] Int. Cl.$^4$ .............................................. H01G 4/38
[52] U.S. Cl. ................................................... 361/329
[58] Field of Search ................................ 361/329, 330

[56] References Cited

U.S. PATENT DOCUMENTS 1,845,130 2/1932 Coursey ............................. 361/329

FOREIGN PATENT DOCUMENTS 515382 12/1939 United Kingdom ................ 361/329

Primary Examiner—Donald A. Griffin

[57] ABSTRACT

An apparatus is provided for holding a plurality of capacitors, the apparatus comprising a mounting plate to which the capacitors can be applied and connection structures for the mutual connection of the positive poles and the negative poles of the capacitors. In order for the mounting to be simplified and in order to hold damage to individual capacitors to only a limited effect, as well as to make them individually replaceable at a later time, the mounting plate includes compartments into which the connecting structure for the positive and negative poles of the capacitors are inserted, separated from one another.

16 Claims, 3 Drawing Figures

APPARATUS FOR HOLDING A PLURALITY OF CAPACITORS

BACKGROUND OF THE INVENTION

1. Field of the Invention

The present invention relates to an apparatus for holding a plurality of capacitors, comprising a mounting plate to which the capacitors can be attached and comprising means for mutually connecting the positive or, respectively, negative poles of the capacitors.

2. Description of the Prior Art

Apparatus of the type set forth above are arranged in mobile X-ray generators, whereby the capacitors serve as a rechargeable battery. A known apparatus of the type initially mentioned comprises a printed circuitboard to which the poles of the capacitors are secured by soldering. The manufacture of a printed circuitboard is expensive and the application of the capacitors to the board is time consuming. Moreover, the entire apparatus must usually be replaced given a defective capacitor, since the printed circuitboard is damaged at the same time.

SUMMARY OF THE INVENTION

The object of the invention, therefore, is to provide apparatus of the type set forth above such that the mounting of the capacitors is simplified. Further, damage to individual capacitors should have only a limited influence and the individual capacitors should also be replaceable at a later time.

The above object is achieved, according to the present invention, in that the mounting plate comprises compartments into which the connecting structure for the positive or, respectively, negative poles of the capacitors can be inserted separated from one another. The connecting structure can be quickly placed in the compartments by way of a mounting plate constructed in accordance with the invention.

It is proposed, in an advantageous embodiment of the invention, that the lateral limitation of the compartments is composed of frame-forming webs. Due to the tracking currents, the height of the webs determines the spacing between the connecting structure for the positive and, respectively, negative poles of the capacitors.

It is proposed according to a particular feature of the invention that the connecting structure comprise metal rails. The metal rails can be cut to order in a simple manner such that they fit accurately into the compartments. This allows the connecting structure to be laid out very quickly.

A technologically simple solution provides that the connecting rails for the positive or for the negative poles of the capacitors are worked of one piece. A further simplification in the laying of the connecting rails is thereby established.

A further simplification in mounting is that the mounting plate and the connecting rails comprise congruent holes for the passage of the capacitor poles. As a result, the capacitors can be connected to the connecting rails with a screw-type connection in a simple manner.

A particularly advantageous embodiment is obtained in that a further plate is connectible to the mounting plate, the further plate being arranged such that the capacitors secured to the mounting plate lie between the mounting plate and the further plate. It is thereby achieved that the further plate lends the capacitors a support for relieving the sensitive capacitor poles.

With a view toward a favorable structural design, it is recommended that spacers be provided between the plates. It is thereby achieved that the capacitors are attached secured between the plates. The capacitors and the plates thereby form one unit in common. A plurality of units can be stacked on top of one another in an X-ray generator, as needed.

It is also recommended in view of a further advantageous structural design that the spacers be uniformly distributed over the mounting plate. It is thereby achieved that the strain on the further plate is distributed roughly uniformly over its area by the spacer pins.

An advantageous improvement of the invention is that the side of the further plate lying opposite the mounting plate is provided with a layer of soft material, for example foamed plastic. It is thereby achieved that potential differences in length of the capacitors are evened out.

One possibility of preventing electrolytic fluid, which seeps from a safety lock applied to the upper side of the capacitor when a capacitor is damaged, from reaching the connecting rail and thereby potentially producing shorts is provided in that the side of the mounting plate on which the capacitors are located comprises transversely extending ribs. The electrolytic fluid now flows off from the capacitors through the gap consequently present between the capacitor and the mounting plate.

A further simplification in mounting the capacitors derives in that the mounting plate is provided with additional holes which lie in the region of the safety closures of the capacitors secured to the mounting plate. A quick determination as to whether the capacitors are correctly mounted can be made through the hole which is respectively congruent with every safety closure. Which capacitor is defective can also be determined.

A simplification in the manufacture of the apparatus is that the mounting plate is cast of one piece together with the webs, the spacers and the ribs.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
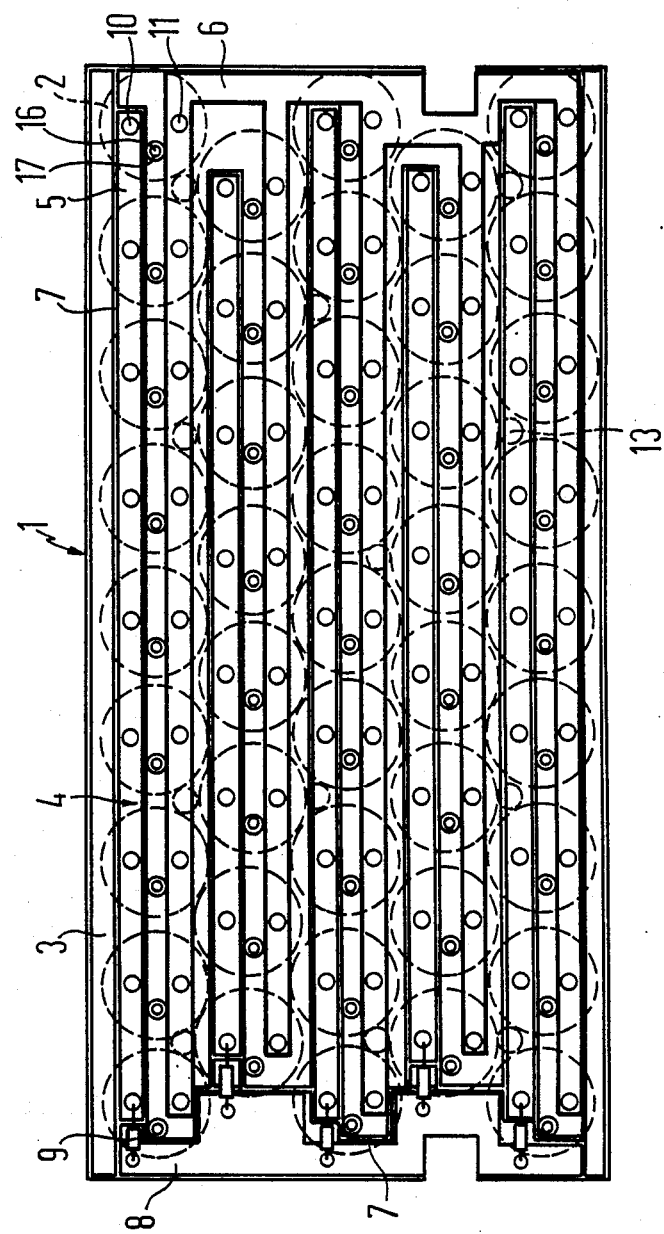
FIG. 1 is a plan view of apparatus constructed in accordance with the invention.

FIG. 1 illustrates an apparatus 1 for holding a plurality of capacitors 2. The apparatus 1 comprises a mounting plate 3 having compartments 4 into which connecting devices 5, 6 can be inserted separated from one another for the positive and negative poles of the capacitors which are then attached in rows. The lateral limitation of the compartments 4 is composed of frameforming webs 7. The connecting device 5 for connecting the positive poles of the capacitors 2 are metal rails which fit precisely into the compartments 4. The connecting rails 5 are connected to one another via a metal plate 8 and fuses 9. The connecting rails 6 for the negative poles of the capacitors 2 are worked from one piece. The mounting plate 3 and the connecting rails 5, 6 comprise congruent holes 10, 11 for the passage of the capacitor poles. The capacitor poles are provided with threads so that the capacitors are connected to the connecting rails 5, 6 with nuts which, being known, are not illustrated on the drawings. The capacitors 2 each comprise a safety closure 16 which is located at the side of the poles. The safety closure serves as a overflow valve for the electrolytic fluid given a damaged capacitor 2. The mounting plate 3 is provided with additional holes 17 which lie in the region of the safety closure 16. As a consequence of the holes 17, first, a check can be carried out so that the capacitors are correctly mounted and, second, a fast determination can be made regarding which capacitor is effective.

Figure 2:
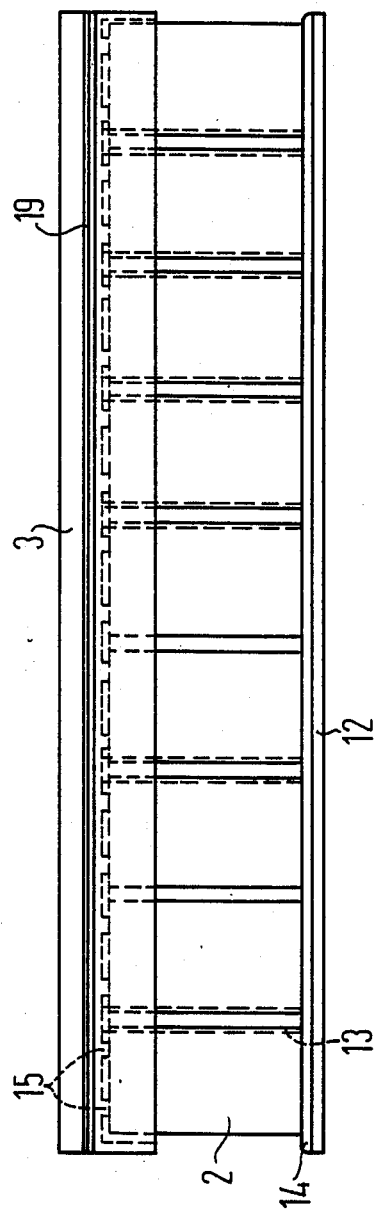
FIG. 2 is a side view of the apparatus of FIG. 1.

FIG. 2 illustrates that a further plate 12 is connectible to a mounting plate 3 via spacers 13. The further plate 12 is thereby arranged such that the capacitors 2 lie between the mounting plate 3 and the further plate 12. The spacers 13, which are preferably rigidly connected to the mounting plate 3 are uniformly distributed thereover. This can also be seen in FIG. 1. The further plate 12 is provided with a layer 14 of soft material, for example foamed plastic, in order to even out the potential differences in length of the capacitors 2. That side of the mounting plate 3 at which the capacitors are located comprises transversely extending ribs 15 so that there is an interval between the capacitors 2 and the mounting plate 3. As a consequence of this interval, the electrolytic fluid that flows out of the safety closure 16, given a defective capacitor 2, can flow down along the capacitor 2. This capacitor can then be easily replaced.

The mounting plate 3, which is manufactured of a plastic material, is cast in one piece together with the webs 7, the spacer 13 and the ribs 15. A simple and easily serviced apparatus 1 for holding and connecting capacitors is thereby established by the design of the mounting plate 3 into which the connecting rails 5, 6 and the metal plate 8 can be placed in a simple manner and connected to the capacitors 2 and the fuses 9.

Figure 3:
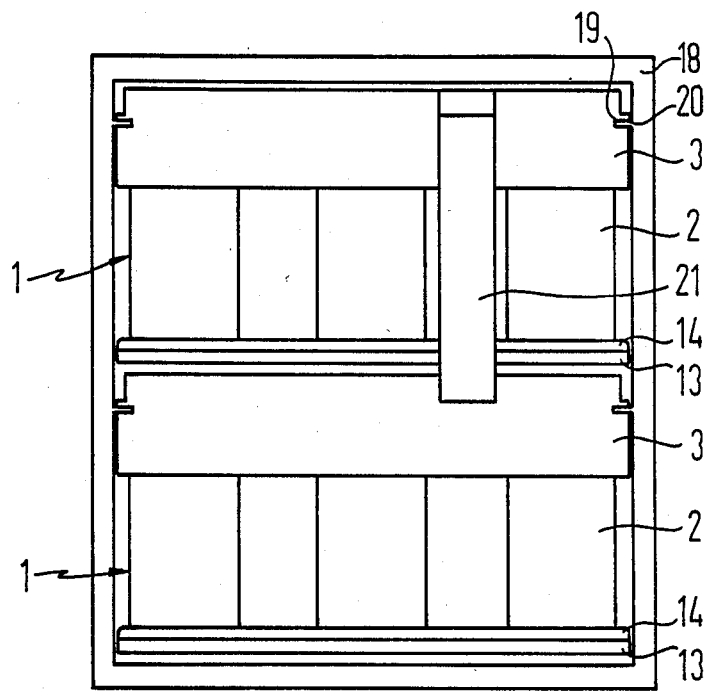
FIG. 3 is a side view of a holder for inserting a plurality of apparatus of the type illustrated in FIG. 1.

FIG. 3 illustrates that a plurality of the apparatus 1 can be inserted on top of one another in a holder 18. This ensures that the long sides of the mounting plate are respectively provided with a groove 19 and the holder is provided with corresponding rails 20 on which the grooves 19 can slide. A rail 21 is provided for connecting each of the apparatus 1 to one another.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for holding a plurality of capacitors of the type which have a positive pole and a negative pole at the same end, said apparatus comprising:

an insulating mounting plate comprising compartment means defining a plurality of spaced compartments; and positive connection means for the positive poles and negative connection means for the negative poles received in said compartments separated from one another.

2. The apparatus of claim 1, wherein:

said compartment means comprises a plurality of webs forming a frame which limits the lateral extent of said compartments.

3. The apparatus of claim 1, wherein:

said positive and negative connection means each comprise metal rails.

4. The apparatus of claim 3, wherein:

said metal rails of one of said connection means are formed as a unitary structure.

5. The apparatus of claim 3, wherein:

each of said metal rails comprises holes for receiving the respective poles of the capacitor.

6. The apparatus of claim 1, and further comprising:

a further mounting plate connected to said insulating mounting plate and sandwiching the capacitor therebetween.

7. The apparatus of claim 6, and further comprising:

spacers mounted between the two mounting plates.

8. The apparatus of claim 7, wherein:

said spacers are evenly distributed.

9. The apparatus of claim 8, wherein:

said spacers are rigidly connected to said insulating mounting plate.

10. The apparatus of claim 9, and further comprising:

a layer of resilient material on said further mounting plate for engaging the capacitors.

11. The apparatus of claim 10, wherein:

said resilient material comprises foamed plastic.

12. The apparatus of claim 1, and further comprising:

transverse ribs on said mounting plate for locating the capacitors.

13. The apparatus of claim 1, and further comprising:

a mounting rack including a pair of spaced elongate ribs;

and wherein said mounting plate comprises a pair of elongate grooves for receiving said elongate ribs.

14. The apparatus of claim 1, wherein the capacitors are electrolytic capacitors and each comprise a safety closure adjacent the positive and negative poles, and wherein:

said mounting plate comprises holes for alignment with the safety closures.

15. The apparatus of claim 1, wherein:

said mounting plate comprises a plurality of elongate webs defining the compartments and a plurality of transverse ribs for locating the capacitors, and said mounting plate with said webs and ribs is a one-piece molded structure.

16. The apparatus of claim 15, wherein:

said one-piece molded structure is a plastic molded structure.

* * * * *